United States Patent
Pullalarevu et al.

(10) Patent No.: US 9,673,433 B1
(45) Date of Patent: Jun. 6, 2017

(54) DEFORMABLE BATTERY PACK ENCLOSURE

(71) Applicant: FORD GLOBAL TECHNOLOGIES, LLC, Dearborn, MI (US)

(72) Inventors: Anil Reddy Pullalarevu, Northville, MI (US); Peyman Aghssa, Ann Arbor, MI (US); Abdelmonaam Sassi, Windsor (CA); Amar Marpu, Canton, MI (US); Nathan Kristofor Tardif, Ferndale, MI (US); Adam Denlinger, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/006,542

(22) Filed: Jan. 26, 2016

(51) Int. Cl.
*H01M 2/10* (2006.01)
*B60K 1/04* (2006.01)
*B60L 11/18* (2006.01)

(52) U.S. Cl.
CPC ............ *H01M 2/1083* (2013.01); *B60K 1/04* (2013.01); *B60L 11/1879* (2013.01); *H01M 2/1077* (2013.01); *B60K 2001/0438* (2013.01); *H01M 2220/20* (2013.01)

(58) Field of Classification Search
CPC ............ H01M 2/1083; H01M 2/1077; H01M 2220/20; B60L 11/1879; B60L 2001/0438; B60K 1/04; B60K 2001/0438
See application file for complete search history.

(56) References Cited

U.S. PATENT DOCUMENTS

| 6,676,200 | B1 | 1/2004 | Peng | |
|---|---|---|---|---|
| 8,696,051 | B2* | 4/2014 | Charbonneau | B62D 21/157 296/187.12 |
| 9,045,030 | B2* | 6/2015 | Rawlinson | B60K 1/04 |
| 2013/0118824 | A1* | 5/2013 | Maeda | B62D 21/157 180/68.5 |
| 2014/0291046 | A1* | 10/2014 | Araki | B60K 1/04 180/68.5 |
| 2015/0207119 | A1* | 7/2015 | Onodera | H01M 2/1077 429/89 |
| 2015/0249240 | A1* | 9/2015 | Hihara | B60K 1/04 180/68.5 |
| 2016/0068195 | A1* | 3/2016 | Hentrich | B60K 1/04 180/68.5 |
| 2016/0233464 | A1* | 8/2016 | Nusier | H01M 2/1072 |
| 2016/0233466 | A1* | 8/2016 | Keller | H01M 2/1077 |

FOREIGN PATENT DOCUMENTS

| DE | 1020009037012 | 2/2011 | |
|---|---|---|---|
| DE | 102012000622 | 7/2013 | |
| DE | 102012000622 A1 * | 7/2013 | ............ B60K 1/04 |
| FR | 2993046 | 1/2014 | |
| WO | 2011135270 | 11/2011 | |
| WO | 2012066247 | 5/2012 | |
| WO | 2015018658 | 2/2015 | |

* cited by examiner

*Primary Examiner* — Drew J Brown
(74) *Attorney, Agent, or Firm* — Carlson, Gaskey & Olds, P.C.

(57) ABSTRACT

An exemplary electrified vehicle assembly includes, among other things, a lower wall of a battery enclosure and an upper wall of the battery enclosure. The upper wall includes an upper wall deformation area that is configured to deform in response to a load applied to the battery enclosure prior to other areas of the upper wall.

19 Claims, 4 Drawing Sheets

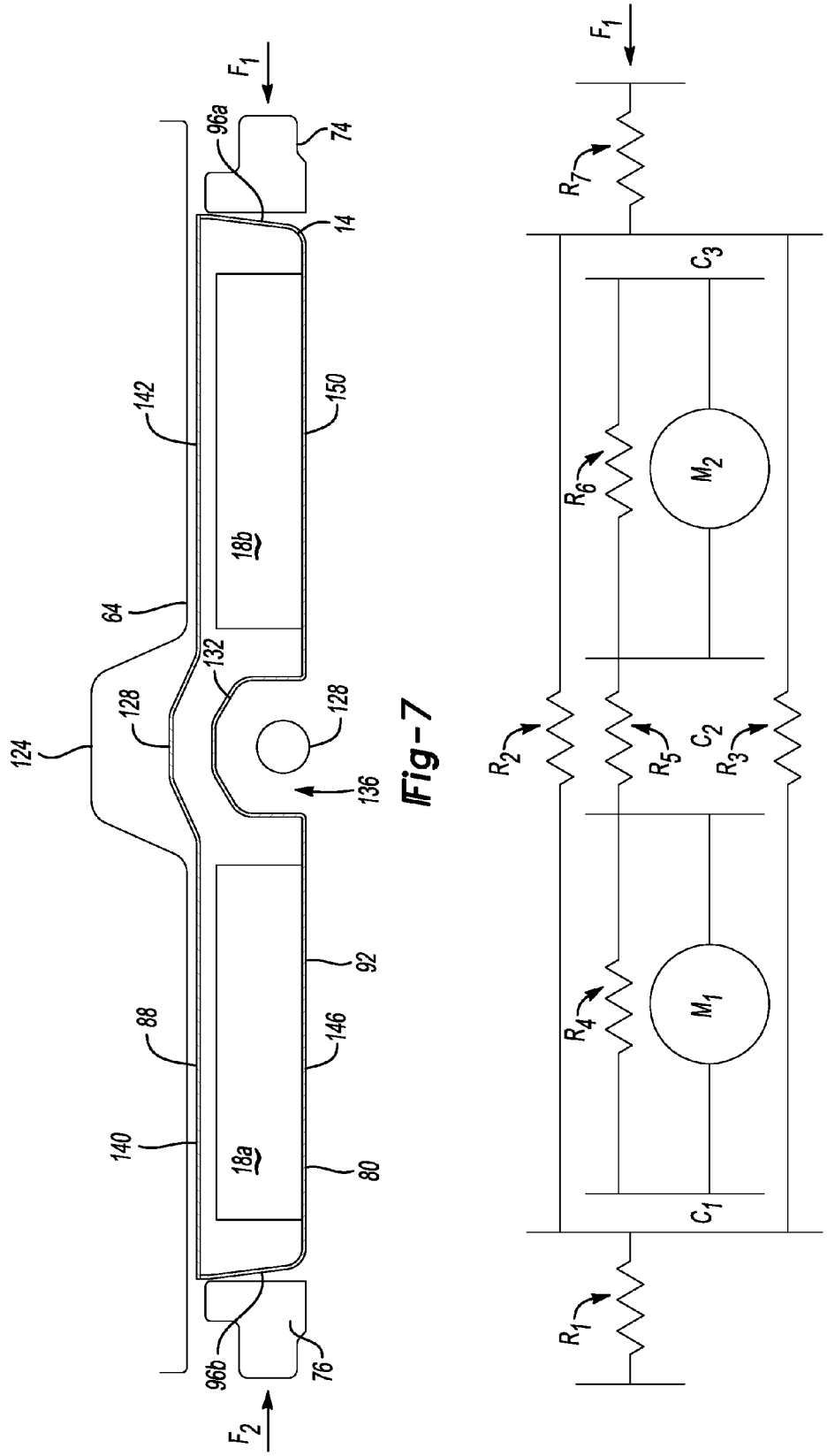

DEFORMABLE BATTERY PACK ENCLOSURE

TECHNICAL FIELD

This disclosure relates generally to a battery pack enclosure and, more particularly, to a battery pack enclosure incorporating areas for controlled deformation under a side impact load.

BACKGROUND

Electrified vehicles differ from conventional motor vehicles because electrified vehicles are selectively driven using one or more electric machines powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

The traction batteries of typical electrified vehicles include arrays of battery cells held within a protective enclosure. Relatively high loads, such as side impact loads to the electrified vehicle, can undesirably disturb the traction batteries even through the arrays are enclosed. The traction batteries can have a relatively large packaging footprint.

SUMMARY

An electrified vehicle assembly according to an exemplary aspect of the present disclosure includes, among other things, a lower wall of a battery enclosure and an upper wall of the battery enclosure. The upper wall includes an upper wall deformation area that is configured to deform in response to a load applied to the battery enclosure prior to other areas of the upper wall.

In a further non-limiting embodiment of the foregoing electrified vehicle assembly, the assembly can include a first array of battery cells on a first lateral side of the upper wall deformation area and a second array of battery cells on an opposing, second lateral side of the upper wall deformation.

In a further non-limiting embodiment of any of the foregoing electrified vehicle assemblies, the assembly can includes a lower wall deformation area of the lower wall. The lower wall deformation area is configured to deform in response to the load prior to other areas of the lower wall.

In a further non-limiting embodiment of any of the foregoing electrified vehicle assemblies, the lower wall deformation area receives an exhaust conduit of an electrified vehicle.

In a further non-limiting embodiment of any of the foregoing electrified vehicle assemblies, the first array is on a first lateral side of the lower wall deformation area and the second array is on an opposing, second lateral side of the lower wall deformation area.

In a further non-limiting embodiment of any of the foregoing electrified vehicle assemblies, the first array and the second array are spaced from all portions of the lower wall deformation area.

In a further non-limiting embodiment of any of the foregoing electrified vehicle assemblies, the lower wall deformation area is a tunnel extending upwardly from a first planar section and a second planar section of the lower wall.

In a further non-limiting embodiment of any of the foregoing electrified vehicle assemblies, the first array is disposed upon the first planar section, and the second array is disposed upon the second planar section.

In a further non-limiting embodiment of any of the foregoing electrified vehicle assemblies, the assembly includes an electrified vehicle. The battery enclosure is secured beneath a floor pan of the electrified vehicle between a front axle and a rear axle.

In a further non-limiting embodiment of any of the foregoing electrified vehicle assemblies, the battery enclosure is secured to the electrified vehicle between the front axle and a heal kick area of the floor pan.

In a further non-limiting embodiment of any of the foregoing electrified vehicle assemblies, the battery enclosure is secured laterally between a first side rocker and an opposing, second side rocker.

In a further non-limiting embodiment of any of the foregoing electrified vehicle assemblies, the load is a side load.

A method of absorbing a side load with a battery pack according to another exemplary aspect of the present disclosure includes, among other things, deforming an upper wall deformation area within an upper wall of a battery pack enclosure in response to a side load applied the battery pack enclosure. The upper wall deformation area is configured to deform prior to a first planar section of the upper wall that is on a first side of the upper wall deformation area and prior to a second planar section of the upper wall that is on an opposing, second side of the upper wall deformation area.

In a further non-limiting embodiment of the foregoing method, the method includes deforming a lower wall deformation area within a lower wall of a battery pack enclosure in response to a side load applied the battery pack enclosure. The lower wall deformation area is configured to deform prior to a first planar section of the lower wall that is on a first side of the lower wall deformation area and prior to a second planar section of the lower wall that is on an opposing, second side of the lower wall deformation area.

In a further non-limiting embodiment of any of the foregoing methods, the method includes recessing an exhaust conduit of an electrified vehicle within the lower wall deformation area.

In a further non-limiting embodiment of any of the foregoing methods, the method includes positioning a first array of battery cells on the first planar section of the lower wall and a second array of battery cells on the second planar second of the lower wall, the first and second arrays spaced from all portions of the lower wall deformation area.

In a further non-limiting embodiment of any of the foregoing methods, the lower wall deformation area is a tunnel extending upwardly relative to the first and second planar section of the lower wall.

In a further non-limiting embodiment of any of the foregoing methods, the method includes mounting the battery pack enclosure beneath a floor pan of an electrified vehicle between a forward axle and a rear axle.

In a further non-limiting embodiment of any of the foregoing methods, the method includes mounting the battery pack enclosure to the electrified vehicle between the forward axle and a heal kick area of the floor pan.

In a further non-limiting embodiment of any of the foregoing methods, the method includes mounting the battery pack enclosure between a first side rocker and an opposing, second side rocker.

BRIEF DESCRIPTION OF THE FIGURES

The various features and advantages of the disclosed examples will become apparent to those skilled in the art from the detailed description. The figures that accompany the detailed description can be briefly described as follows:

FIG. 7 shows a section view at line 7-7 in FIG. 4.

FIG. 8 shows an energy management model corresponding to the section view of FIG. 7.

DETAILED DESCRIPTION

This disclosure relates generally to a battery pack. An enclosure of the battery back incorporates deformation areas that deform in response to a load above a threshold value. The deformation areas facilitate a controlled deformation of battery pack under load to absorb energy. The controlled deformation protects arrays of battery cells within the battery pack.

Figure 1:
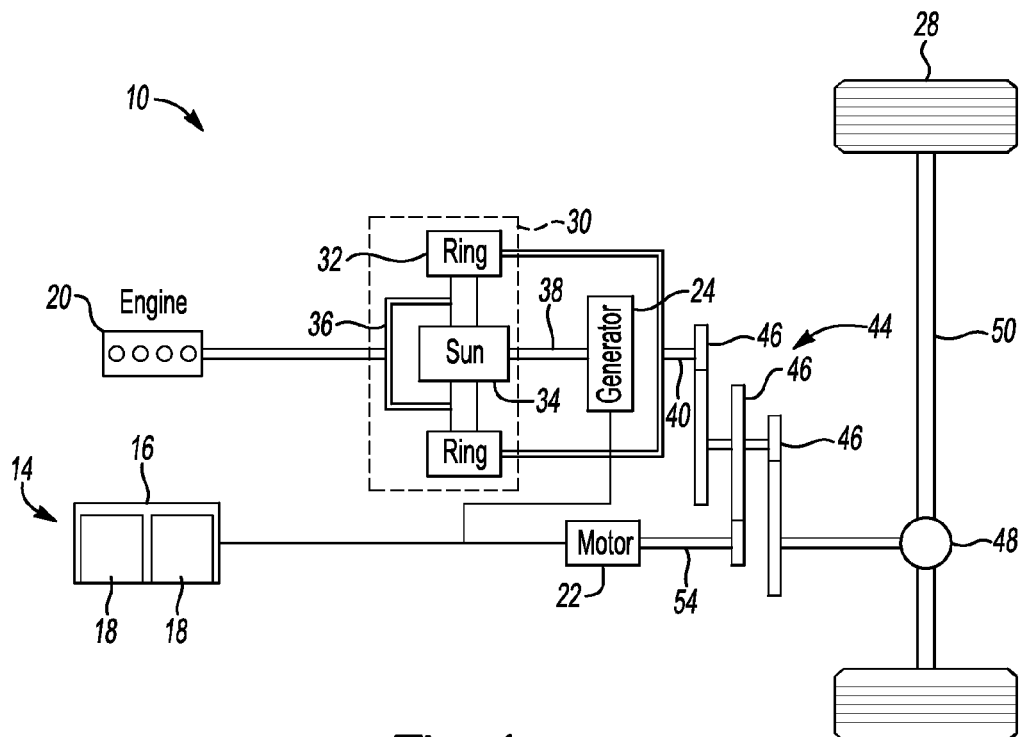
FIG. 1 shows an example electrified vehicle powertrain.

Referring to FIG. 1, a powertrain 10 of a hybrid electric vehicle (HEV) includes a battery pack 14 including an enclosure 16 housing a plurality of battery arrays 18. The example battery pack 14 is a high-voltage traction battery pack that can provide power to drive the HEV.

The powertrain 10 further includes an internal combustion engine 20, a motor 22, and a generator 24. The motor 22 and the generator 24 are types of electric machines. The motor 22 and generator 24 may be separate or have the form of a combined motor-generator.

In this embodiment, the powertrain 10 is a power-split powertrain that employs a first drive system and a second drive system. The first and second drive systems generate torque to drive one or more sets of vehicle drive wheels 28. The first drive system includes a combination of the engine 20 and the generator 24. The second drive system includes at least the motor 22, the generator 24, and the battery pack 14. The motor 22 and the generator 24 are portions of an electric drive system of the powertrain 10.

The engine 20 and the generator 24 can be connected through a power transfer unit 30, such as a planetary gear set. Of course, other types of power transfer units, including other gear sets and transmissions, can be used to connect the engine 20 to the generator 24. In one non-limiting embodiment, the power transfer unit 30 is a planetary gear set that includes a ring gear 32, a sun gear 34, and a carrier assembly 36.

The generator 24 can be driven by the engine 20 through the power transfer unit 30 to convert kinetic energy to electrical energy. The generator 24 can alternatively function as a motor to convert electrical energy into kinetic energy, thereby outputting torque to a shaft 38 connected to the power transfer unit 30.

The ring gear 32 of the power transfer unit 30 is connected to a shaft 40, which is connected to the vehicle drive wheels 28 through a second power transfer unit 44. The second power transfer unit 44 may include a gear set having a plurality of gears 46. Other power transfer units could be used in other examples.

The gears 46 transfer torque from the engine 20 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 can be selectively employed to drive the vehicle drive wheels 28 by outputting torque to a shaft 54 that is also connected to the second power transfer unit 44. In this embodiment, the motor 22 and the generator 24 cooperate as part of a regenerative braking system in which both the motor 22 and the generator 24 can be employed as motors to output torque. For example, the motor 22 and the generator 24 can each output electrical power to recharge cells of the battery pack 14.

Figure 2:
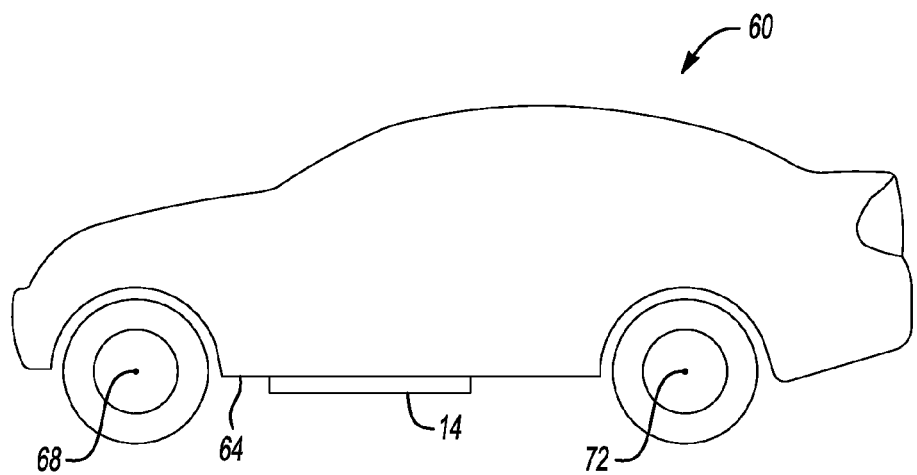
FIG. 2 shows a side profile of an example electrified vehicle incorporating the powertrain of FIG. 1.
Figure 3:
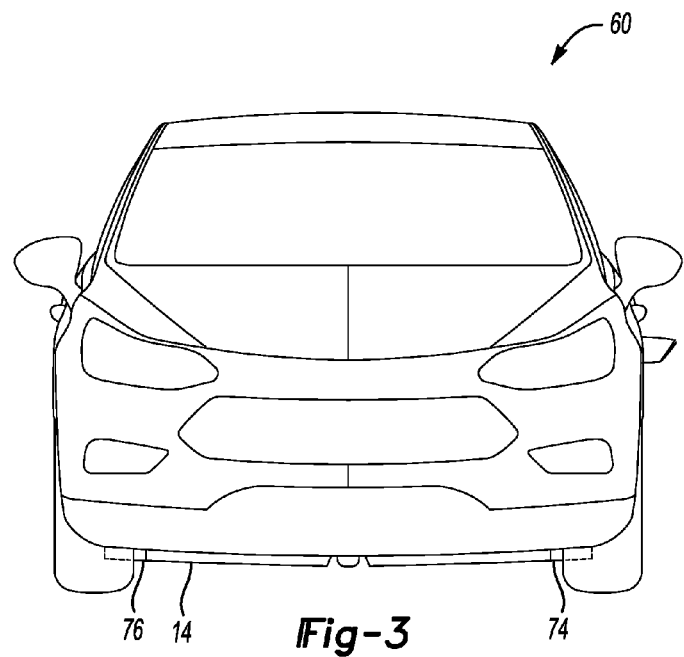
FIG. 3 shows a front view of the electrified vehicle of FIG. 2.

Referring to FIGS. 2 and 3, an electrified vehicle 60 includes the powertrain 10 of FIG. 1. In this example, the battery pack 14 mounts to a floor pan 64 of the vehicle 60. As shown in FIG. 2, the battery pack 14 is positioned between a front axle 68 and a rear axle 72 of the vehicle 60. As shown in FIG. 2, the battery pack 14 is positioned between a first rocker 74 on a first side of the vehicle 60 and a second rocker 76 on an opposing, second side of the vehicle 60. The battery pack 14 can be secured directly to the first rocker 74 and the second rocker 76 is some examples.

Figure 4:
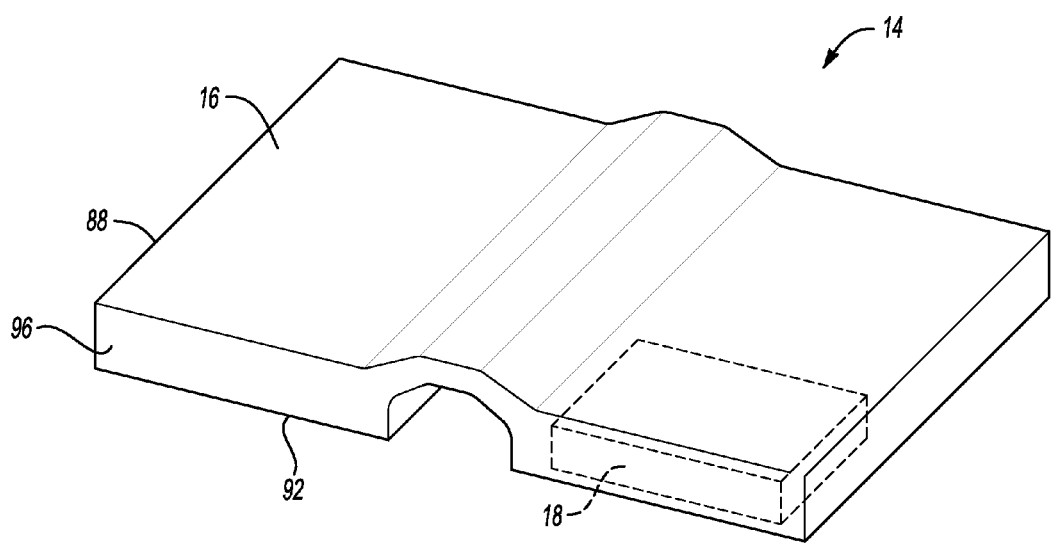
FIG. 4 shows a perspective view of a battery pack from the powertrain of FIG. 1.

Referring now FIG. 4, the enclosure 16 of the battery pack 14 includes an upper wall 88 or cover, and a lower wall 92 or tray. Side walls 96 extend between the upper wall 88 and the lower wall 92. The enclosure provides an open area that receives a plurality of the arrays 18. In this example, the upper wall 88 is secured to upwardly facing surfaces of the sidewalls 96 to enclose the arrays 18 within the enclosure 16.

Figure 5:
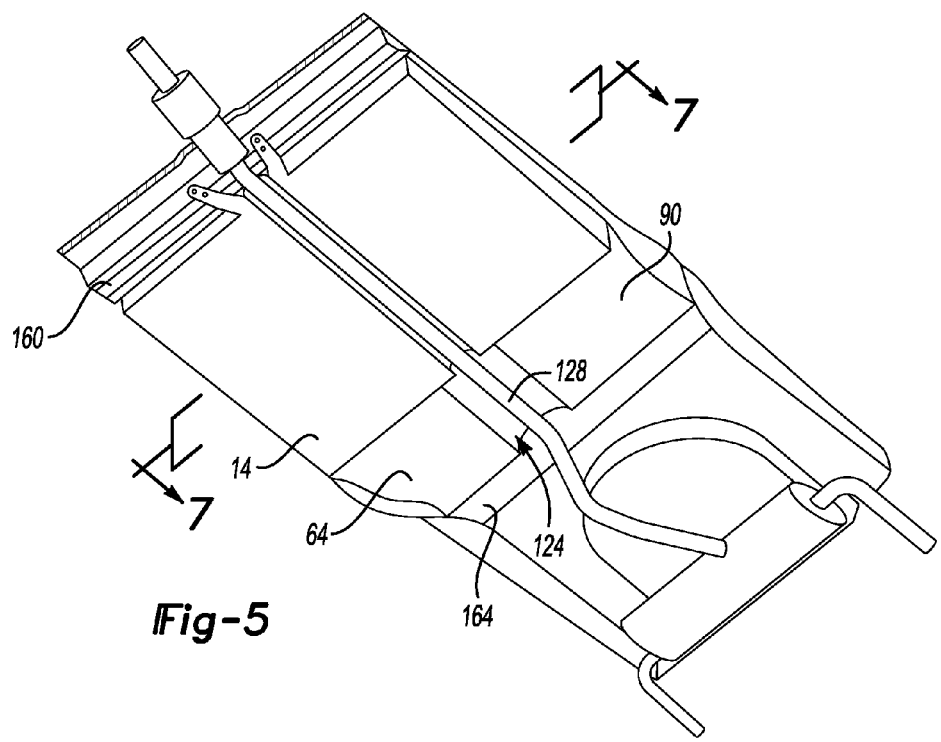
FIG. 5 shows a perspective view of the battery pack of FIG. 4 mounted to a floor pan of the electrified vehicle of FIG. 2.
Figure 6:
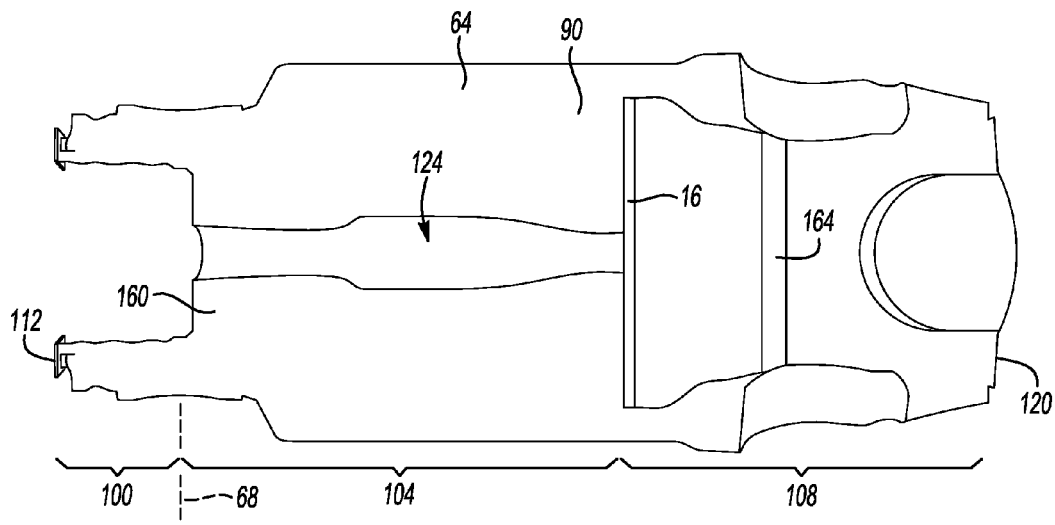
FIG. 6 shows a bottom view of the floor pan of FIG. 4.

Referring now to FIGS. 5 and 6 with continuing reference to FIG. 4, the battery pack 14 is secured within the vehicle 60 such that the upper wall 88 nests against a downwardly facing surface 90 of the floor pan 64. The battery pack 14 can be secured to the floor pan 64 using, for example, mechanical fasteners.

The floor pan 64 generally includes a forward area 100, a center area 104, and a rear area 108. The forward area 100 extends from a leading edge 112 of the floor pan 64 to a position aligned with the front axle 68. The center area 104 extends from the position aligned with the front axle 68 to a heel kick 116 of the floor pan 64. The rear area 108 extends from the heel kick 116 to a trailing edge 120 of the floor pan 64.

In this example, the battery pack 14 is secured to the center area 104 of the floor pan 64 such that the battery pack 14 is positioned between the front axle 68 and the heel kick 116 when the battery pack 14 is in an installed position. The heel kick 116 is aligned, in this example, with a forward edge of a rear passenger seat within a passenger compartment the vehicle 60.

The floor pan 64 includes a tunnel 124 that enables an exhaust conduit 128 to be raised vertically while maintaining appropriate clearance to the floor pan 64. The example exhaust conduit 128 carries products of combustion expelled from the internal combustion engine 20 (FIG. 1). The tunnel 124 can also provide clearance for a 12 Volt cable, brake cable, fuel line bundle, etc.

The floor pan 64 can be used in the electrified vehicle 60 as shown, or used in a conventional vehicle that does not include a traction battery pack. Using a common design for the floor pan 64 in both a conventional vehicle and the electrified vehicle 60 can reduce, among other things, manufacturing costs and complexity associated with the manufacturing of the floor pan 64.

In this example, the upper wall 88 of the enclosure 16 includes an upper wall deformation area 128 that extends into the tunnel 124 when the battery pack 14 is in the installed position. In other examples, the upper wall deformation area 128 extends toward, but not into, the tunnel 124. In other examples, the upper wall deformation area 128 is generally planar, or extends downwardly. The lower wall 92 includes an exemplary lower wall deformation area 132 that extends upwardly toward the tunnel 124. In other examples, the lower wall deformation area 132 is generally planar or extends downward.

In this example, the lower wall deformation area 132 provides an enclosure tunnel 136 that at least partially receives a portion of the exhaust conduit 128. This provides clearance between the exhaust conduit 128 and the ground. The exemplary exhaust conduit 128 is part of a centerline exhaust system.

The lower wall deformation area 132 is aligned with the upper wall deformation area 128. The lower wall deformation area 132 extends upwardly a greater amount than the upper wall deformation area 128 such that the enclosure 16 has a narrower vertical cross section at and near a cross-vehicle center of the enclosure 16.

Referring now to the cross-sectional view of FIG. 7, the example upper wall deformation area 128 extends upwardly from a first generally planar portion 140 of the upper wall 88 and a second generally planar portion 142 of the upper wall 88. The lower wall deformation area 132 extends upwardly from a first generally planar portion 146 of the lower wall 92 and a second generally planar portion 150 of the lower wall 92.

The upper wall deformation area 128 is positioned laterally between the first planar portion 140 and the second planar portion 142. The lower wall deformation area 132 is positioned laterally between the first planar portion 146 and the second planar portion 150. The upper wall deformation area 128 and the lower wall deformation area 132 are laterally aligned in this example.

In this example, at least one first array 18a is disposed upon the first planar portion 146, and at least one second array 18b of battery cells is disposed upon the second planar portion 150. Notably, the first array 18a and the second array 18b are spaced from all portions of the lower wall deformation area 132.

A side impact to a first side to the electrified vehicle can apply a force $F_1$ through the first rocker 74 to the battery pack 14. A side impact to an opposing, second side of the electrified vehicle 60 can apply a force $F_2$ through the second rocker 76 to the battery pack 14.

If the force $F_1$ on the enclosure 16 exceeds a threshold value at least the upper wall deformation area 128 of the enclosure 16 begins to deform. A designer of the enclosure 16 could tune the threshold value as desired by strengthening or weakening the deformation area 128. The threshold value could be tuned to loads for specific vehicle programs.

In this example, the geometry of the upper wall deformation area 128 causes upper wall deformation area 128 to deform in response to the force $F_1$ prior to other portions of the upper wall 88. This allows the upper wall 88 to absorb the force $F_1$ without disrupting areas of the upper wall 88 near the arrays 18a and 18b. In this example, the upper wall deformation area 128 buckles and folds upwards into the tunnel 124 in response to the force $F_1$.

If the force $F_1$ exceeds a threshold value, at least the lower wall deformation area 132 of the enclosure 16 begins to deform. In this example, the geometry of the lower wall deformation area 132 causes the lower wall deformation area 132 to deform in response to the force $F_1$ prior to other portions of the lower wall 92.

The upper wall deformation area 128 and the lower wall deformation area 132 cause the battery pack enclosure 16 to controllably deform in response to a side load above the threshold value. Focusing the deformation in the upper wall deformation area 128 and the lower wall deformation area 132 can reduce disturbances to the arrays 18a and 18b.

Although the geometries of the upper wall deformation area 128 and the lower wall deformation area 132 cause the controlled deformation in this example, other techniques could be utilized to provide the controlled deformation in the upper wall deformation area 128 and the lower wall deformation area 132. For example, the upper wall deformation area 128 could be generally planar, but made of a weaker material than the generally planar portion 140 and the generally planar portion 142. The upper wall deformation area 128 could be a generally planar area of the upper wall 88 that is thinned to weaken the upper wall deformation area 128 relative to other portions of the upper wall 88. The lower wall deformation area 132 could similarly be generally planar and made of a weaker or thinned material relative to the generally planar portion 146 and the generally planar portion 150.

FIG. 8 shows an energy management model of the cross-section of FIG. 7 when the force $F_1$ is applied to the electrified vehicle 60. $R_1$ represents a resistance to the force $F_1$ provided by a sidewall 96a of the battery pack enclosure 16. $R_2$ represents a resistance to the force $F_1$ provided by a front cross member 160 (FIGS. 4 and 5) of the floor pan 64. $R_3$ represents a resistance to the force $F_1$ provided by a rear cross member 164 of the floor pan 64. $R_4$ represents a resistance to the force $F_1$ provided by the first planar portion 140 of the upper wall 88 and the first planar section 146 of the lower wall 92. $R_6$ represents resistance to the force $F_1$ provided by the second planar section 142 of the upper wall 88 and the second planar section 150 of the lower wall 92. $R_5$ represents a resistance to the force $F_1$ provided by the upper wall deformation area 128 of the upper wall 88 and the lower wall deformation area 132 of the lower wall 92. $R_7$ represents resistance provided by the frame structure of the floor pan 64 and a sidewall 96b of the enclosure 16 opposite the force $F_1$.

$M_1$ represents the array 18a, and $M_2$ represents the array 18b. $C_1$ represents clearance between the array 18a and the sidewall 96a. $C_2$ represents clearance between the array 18a and the array 18b. $C_3$ represents clearance between the array 18b and the sidewall 96b.

As shown, the resistance $R_5$ is less than each of the resistances $R_1$, $R_2$, $R_3$, $R_4$, $R_6$, and $R_7$. Thus, when the force $F_1$ is applied, the enclosure 16 gives and deforms within the upper wall deformation area 128, the lower wall deformation area 132, or both. This provides a controlled deformation of the enclosure 16, which can maintain the clearances $C_1$, $C_2$, and $C_3$ to reduce disturbances to the arrays 18a and 18b.

In addition to the upper wall deformation area 124 and the lower wall deformation area 132, the resistances provided by the rockers 74 and 76 (not shown in FIG. 8) can be less than the resistances $R_1$-$R_7$ so that the rockers 74 and 76 deform and collapse in response to the force F1 or F2 prior to the enclosure 16.

Features of the disclosed examples include a battery pack spanning from a first rocker to an opposing, second rocker.

The battery pack has deformation areas to provide a controlled deformation of the battery pack under a side load. Deformation is concentrated in desired areas to avoid disruptions to battery cell arrays within an enclosure the battery pack. The exemplary battery pack includes the deformation areas in a central area of the battery pack to provide the battery pack with a "soft" center. The exemplary battery pack manages side impact loads by deforming into a tunnel of the floor pan.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. An electrified vehicle assembly, comprising:
   a lower wall of a battery enclosure, the lower wall including a lower wall deformation area configured to receive an exhaust conduit of an electrified vehicle and to deform in response to a load applied to the battery enclosure prior to other areas of the lower wall; and
   an upper wall of the battery enclosure, the upper wall including an upper wall deformation area configured to deform in response to the load prior to other areas of the upper wall.

2. The electrified vehicle assembly of claim 1, further comprising a first array of battery cells on a first lateral side of the upper wall deformation area and a second array of battery cells on an opposing, second lateral side of the upper wall deformation.

3. The electrified vehicle assembly of claim 1, wherein the first array is on a first lateral side of the lower wall deformation area and the second array is on an opposing, second lateral side of the lower wall deformation area.

4. The electrified vehicle assembly of claim 3, wherein the first array and the second array are spaced from all portions of the lower wall deformation area.

5. The electrified vehicle assembly of claim 1, wherein the lower wall deformation area is a tunnel extending upwardly from a first planar section and a second planar section of the lower wall.

6. The electrified vehicle assembly of claim 5, wherein the first array is disposed upon the first planar section, and the second array is disposed upon the second planar section.

7. The electrified vehicle assembly of claim 1, further comprising the electrified vehicle, wherein the battery enclosure is secured beneath a floor pan of the electrified vehicle between a front axle and a rear axle.

8. The electrified vehicle assembly of claim 7, wherein the battery enclosure is secured to the electrified vehicle between the front axle and a heal kick area of the floor pan.

9. The electrified vehicle assembly of claim 7, wherein the battery enclosure is secured laterally between a first side rocker and an opposing, second side rocker.

10. The electrified vehicle assembly of claim 1, wherein the load is a side load.

11. A method of absorbing a side load with a battery pack, comprising:
    deforming an upper wall deformation area within an upper wall of a battery pack enclosure and a lower wall deformation area within a lower wall of the battery pack enclosure in response to a side load applied the battery pack enclosure, the upper wall deformation area configured to deform prior to a first planar section of the upper wall that is on a first side of the upper wall deformation area and prior to a second planar section of the upper wall that is on an opposing, second side of the upper wall deformation area, the lower wall deformation area configured to deform prior to a first planar section of the lower wall that is on a first side of the lower wall deformation area and prior to a second planar section of the lower wall that is on an opposing, second side of the lower wall deformation area; and
    recessing an exhaust conduit of an electrified vehicle within the lower wall deformation area.

12. The method of claim 11, further comprising positioning a first array of battery cells on the first planar section of the lower wall and a second array of battery cells on the second planar second of the lower wall, the first and second arrays spaced from all portions of the lower wall deformation area.

13. The method of claim 12, wherein the lower wall deformation area is a tunnel extending upwardly relative to the first and second planar section of the lower wall.

14. The method of claim 11, further comprising mounting the battery pack enclosure beneath a floor pan of an electrified vehicle between a forward axle and a rear axle.

15. The method of claim 14, further comprising mounting the battery pack enclosure to the electrified vehicle between the forward axle and a heal kick area of the floor pan.

16. The method of claim 14, further comprising mounting the battery pack enclosure between a first side rocker and an opposing, second side rocker.

17. A battery enclosure assembly, comprising:
    a lower enclosure wall with a lower wall deformation area configured to deform in response to an applied load prior to other areas of the lower enclosure wall, and configured to receive an exhaust conduit; and
    an upper enclosure wall with an upper wall deformation area configured to deform in response to the applied load prior to other areas of the upper enclosure wall.

18. The battery enclosure assembly of claim 17, further comprising a first array of battery cells on a first lateral side of the lower wall deformation area and a second array of battery cells on an opposing, second lateral side of the lower wall deformation area.

19. The battery enclosure assembly of claim 17, wherein the lower wall deformation area is a tunnel extending upwardly from a first planar section and a second planar section of the lower enclosure wall.

* * * * *

UNITED STATES PATENT AND TRADEMARK OFFICE
CERTIFICATE OF CORRECTION

| | | |
|---|---|---|
| PATENT NO. | : 9,673,433 B1 | Page 1 of 1 |
| APPLICATION NO. | : 15/006542 | |
| DATED | : June 6, 2017 | |
| INVENTOR(S) | : Anil Reddy Pullalarevu et al. | |

It is certified that error appears in the above-identified patent and that said Letters Patent is hereby corrected as shown below:

In the Claims

In Claim 3, Column 7, Line 34; before "wherein" replace "1," with --2,--

In Claim 6, Column 7, Line 45; after "wherein" replace "the" with --a--

In Claim 6, Column 7, Line 46; after "section, and" replace "the" with --a--

In Claim 11, Column 8, Line 8; after "side load" replace "applied the" with --applied to the--

In Claim 12, Column 8, Line 25; after "second planar" replace "second" with --section--

Signed and Sealed this
Twenty-ninth Day of August, 2017

Joseph Matal
*Performing the Functions and Duties of the*
*Under Secretary of Commerce for Intellectual Property and*
*Director of the United States Patent and Trademark Office*